US012109537B1

(12) United States Patent
Saleem et al.

(10) Patent No.: US 12,109,537 B1
(45) Date of Patent: *Oct. 8, 2024

(54) BI-LAYERED SUPERHYDROPHOBIC MEMBRANE FOR WATER FILTRATION

(71) Applicant: KING FAISAL UNIVERSITY, Al-Ahsa (SA)

(72) Inventors: Junaid Saleem, Doha (QA); Safdar Hossain Sk, Hofuf (SA); Zubair Khalid Baig Moghal, Doha (QA); Gordon McKay, Doha (QA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

This patent is subject to a terminal disclaimer.

(21) Appl. No.: 18/444,479

(22) Filed: Feb. 16, 2024

(51) Int. Cl.
| | |
|---|---|
| *B01D 61/14* | (2006.01) |
| *B01D 17/04* | (2006.01) |
| *B01D 69/02* | (2006.01) |
| *B01D 69/12* | (2006.01) |
| *B01D 71/26* | (2006.01) |

(52) U.S. Cl.
CPC ............ *B01D 69/02* (2013.01); *B01D 17/04* (2013.01); *B01D 61/147* (2013.01); *B01D 69/1218* (2022.08); *B01D 71/262* (2022.08); *B01D 2325/0233* (2022.08); *B01D 2325/04* (2013.01); *B01D 2325/06* (2013.01); *B01D 2325/24* (2013.01); *B01D 2325/38* (2013.01)

(58) Field of Classification Search
CPC .. B01D 61/147; B01D 69/02; B01D 69/1218; B01D 71/262; B01D 2325/38
See application file for complete search history.

(56) References Cited

U.S. PATENT DOCUMENTS

| | | | |
|---|---|---|---|
| 11,840,609 B1 * | 12/2023 | Saleem | ............ C08J 7/056 |
| 11,859,065 B1 * | 1/2024 | Saleem | ............ C08J 7/054 |
| 2019/0209973 A1 | 7/2019 | Widjojo et al. | |

FOREIGN PATENT DOCUMENTS

CN 101862601 A 10/2010

OTHER PUBLICATIONS

Himma, Nurul Faiqotul, Anita Kusuma Wardani, and I. Gede Wenten. "Preparation of superhydrophobic polypropylene membrane using dip-coating method: the effects of solution and process parameters." Polymer-Plastics Technology and Engineering 56.2 (2017): 184-194. (Year: 2017).*

(Continued)

*Primary Examiner* — Bradley R Spies
(74) *Attorney, Agent, or Firm* — Nath, Goldberg & Meyer; Joshua B. Goldberg

(57) ABSTRACT

A bi-layered superhydrophobic membrane includes top and base layers formed from polypropylene. The bi-layered superhydrophobic membrane can have a thickness ranging from about 100 μm to about 1 mm. When subjected to oil-water emulsion separations, the superhydrophobic membrane can achieve an organic solvent flux of 14,000 $Lm^{-2}h^{-1}$ with a 96% water rejection. The bi-layered superhydrophobic membrane can be effectively used for water filtration, providing both selectivity and permeability, while offering an eco-friendly solution for reuse of polypropylene plastic waste.

15 Claims, 12 Drawing Sheets

(56) References Cited

OTHER PUBLICATIONS

Franco, Julianna A., et al. "Fabrication of a superhydrophobic polypropylene membrane by deposition of a porous crystalline polypropylene coating." Journal of Membrane Science 318.1-2 (2008): 107-113. (Year: 2008).*

Wu, et al.; "A Bioinspired Strategy to Construct Dual-Superlyophobic Ppmb Membrane for Switchable Oil/Water Separation"Journal of Membrane Science vol. 665, Jan. 5, 2023, 121128.

* cited by examiner

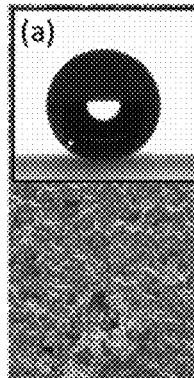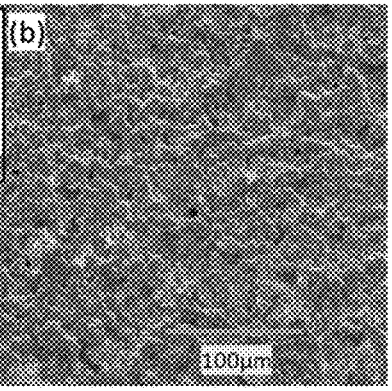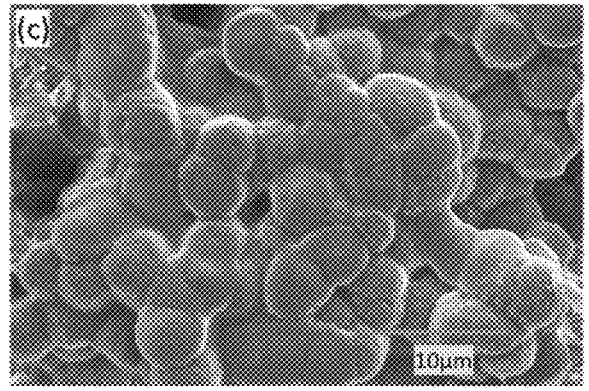
FIGS. 4A, 4B  FIG. 4C
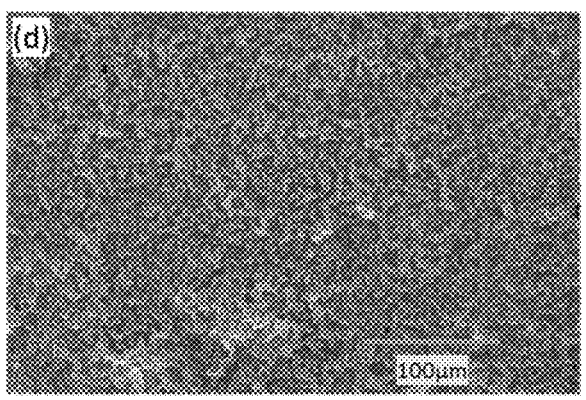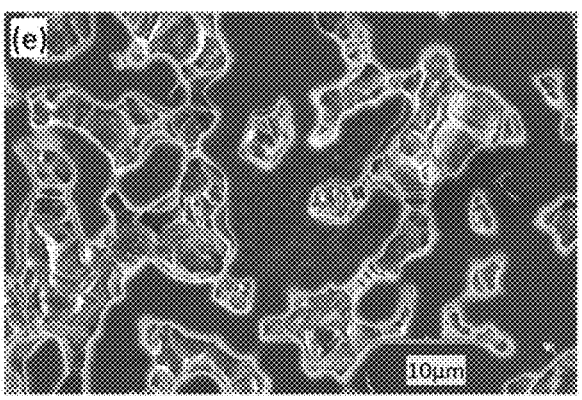
FIGS. 4D  FIG. 4E
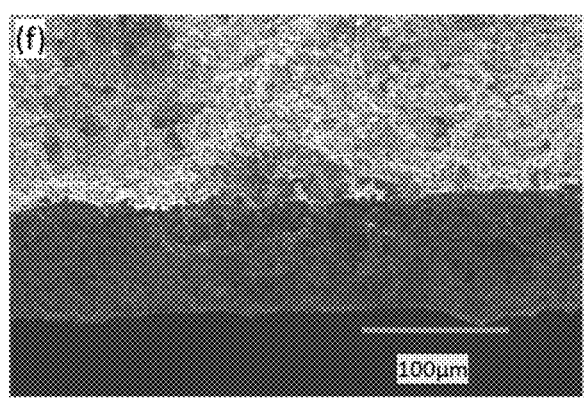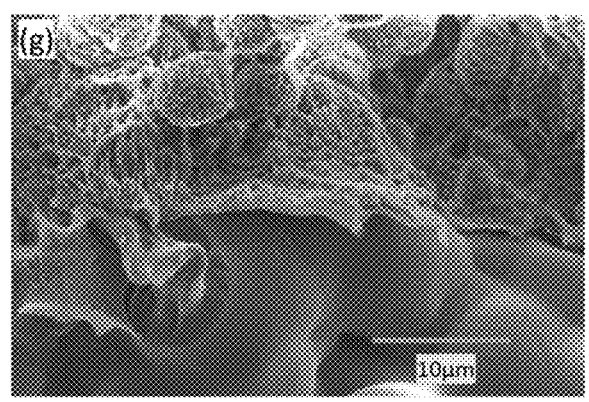
FIGS. 4F  FIG. 4G

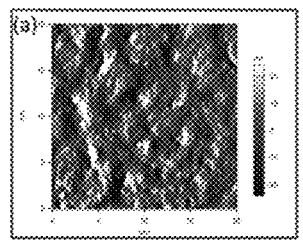 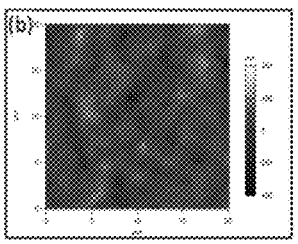 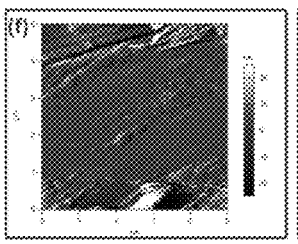 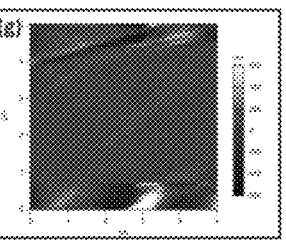
*FIG. 8A*    *FIG. 8B*    *FIG. 8F*    *FIG. 8G*
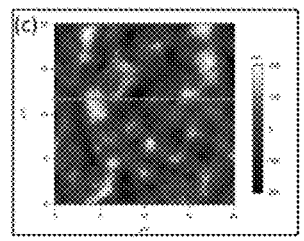 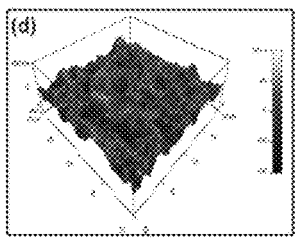 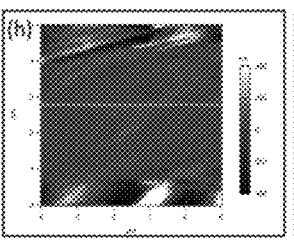 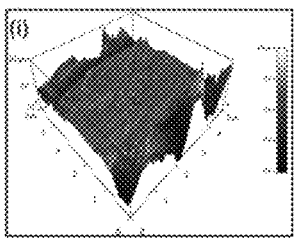
*FIG. 8C*    *FIG. 8D*    *FIG. 8H*    *FIG. 8I*
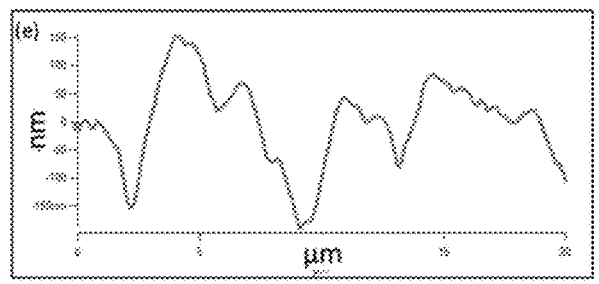 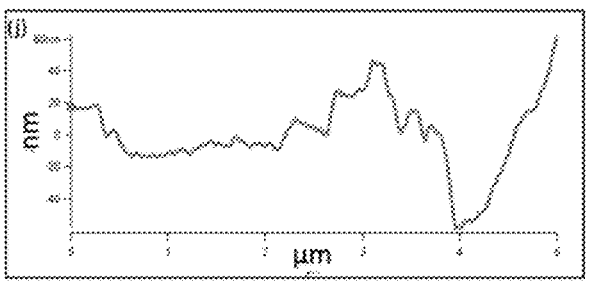
*FIG. 8E*    *FIG. 8J*

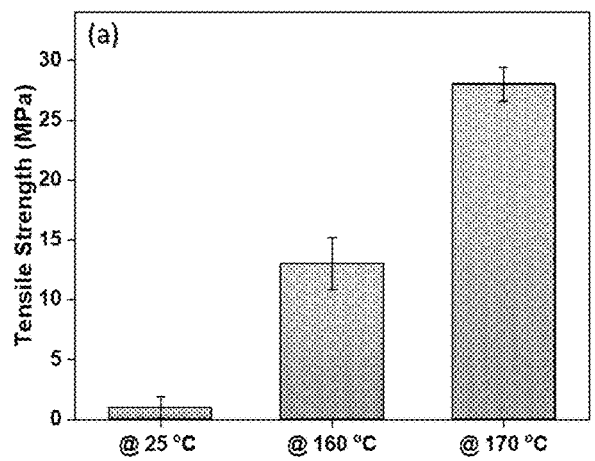
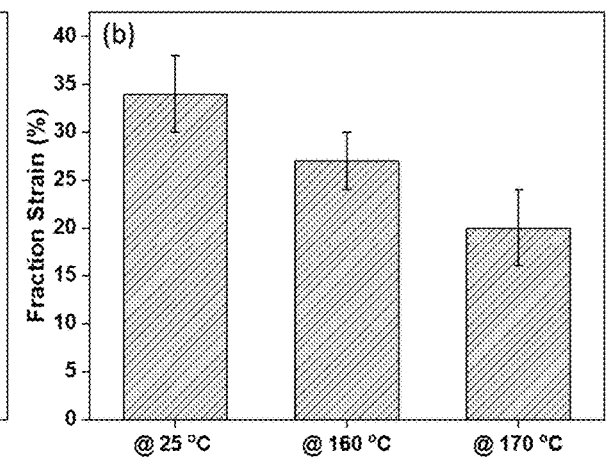
FIG. 9A          FIG. 9B
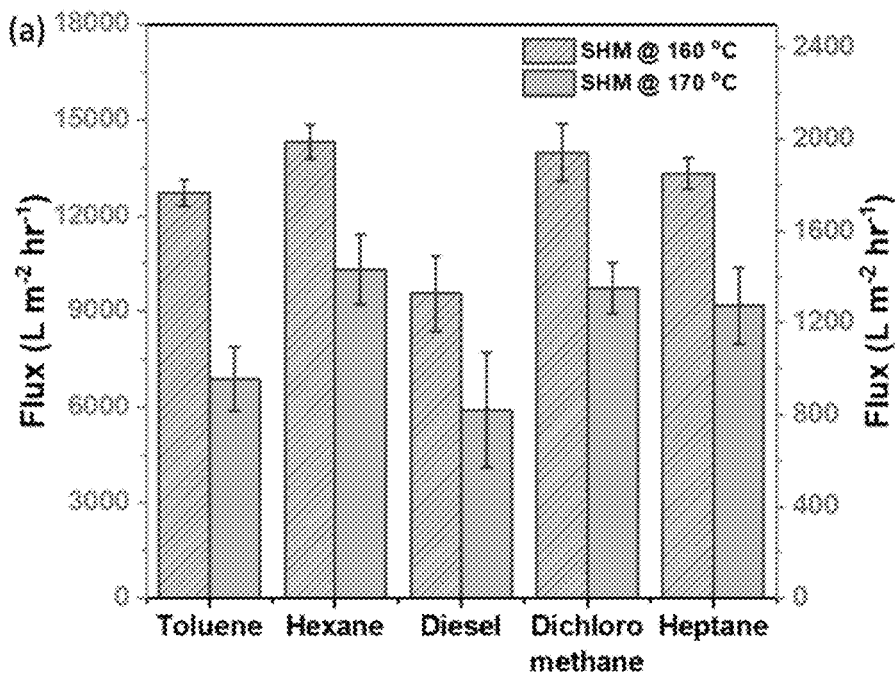
FIG. 10A

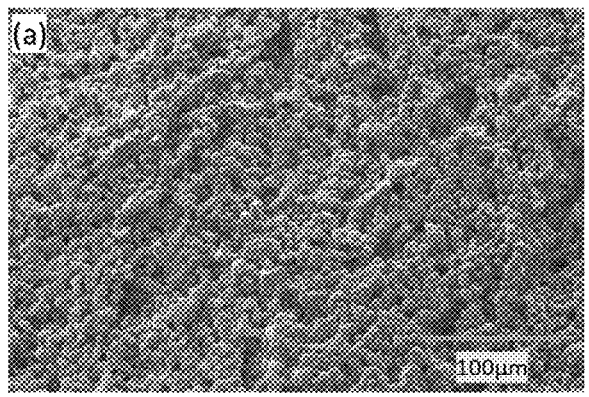
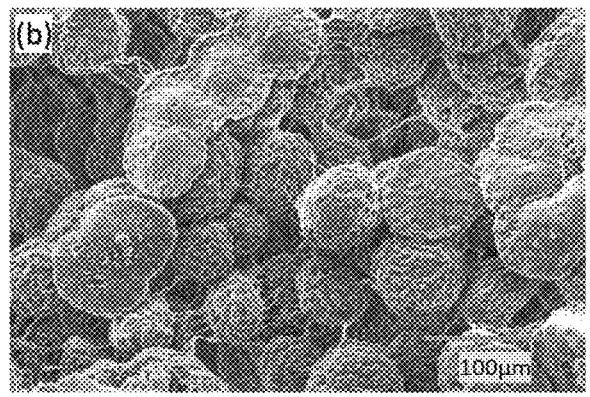
FIG. 12A  FIG. 12B
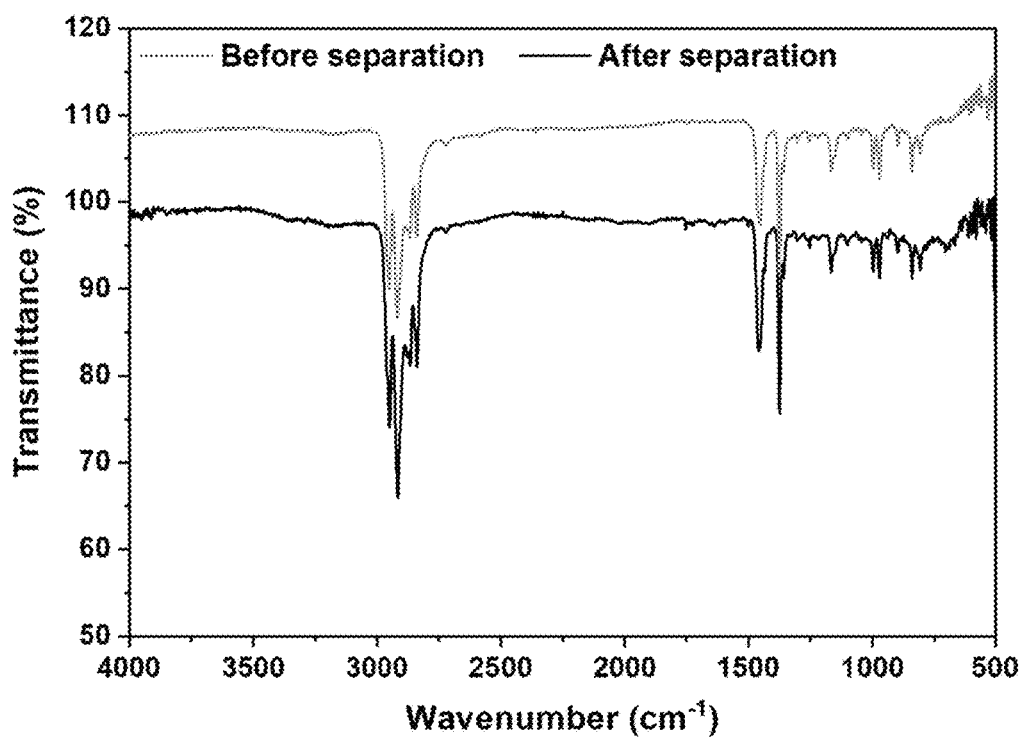
FIG. 13

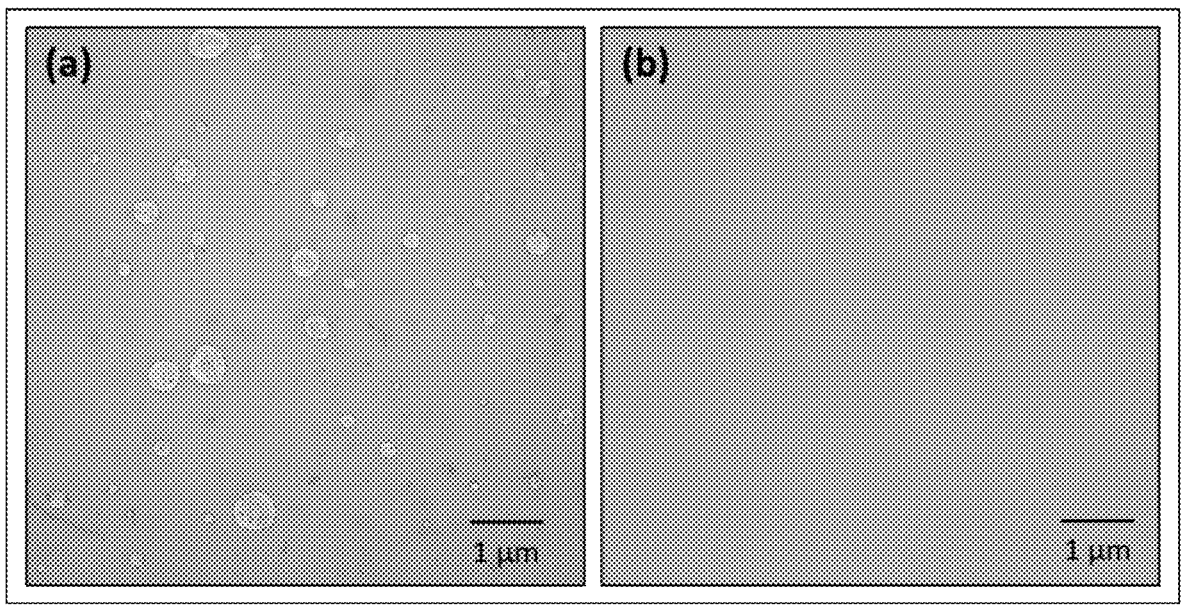
*FIG. 14A*   *FIG. 14B*

BI-LAYERED SUPERHYDROPHOBIC MEMBRANE FOR WATER FILTRATION

BACKGROUND

1. Field

The present disclosure relates to membranes for water filtration and, particularly, to a bi-layered superhydrophobic membrane for water filtration.

2. Description of the Related Art

Membrane filtration of water presents several advantages over thermal-based purification, making it an appealing option for achieving sustainability in the water treatment industry. One significant advantage is its reduced energy consumption when compared to thermal processes, which account for 40% of the industry's operational energy. It offers a compelling alternative to traditional processes like distillation and crystallization. Moreover, the sustainability of membrane filtration can be significantly enhanced by carefully considering the choice of material, the synthesis route, and the specific end application. Among various types of materials, polymers lead the market due to their low cost, processability, scalability, and versatility. Particularly, when dealing with solvent-water emulsions, polymeric membranes demonstrate considerable value and potential.

In recent years, microporous membrane technology has been successfully used for water treatment and various wastewater treatment. Microporous membrane technology has been used in groundwater treatment, food industry wastewater treatment, electronics industry wastewater treatment, chemical industry wastewater treatment, and animal husbandry wastewater treatment, for example.

The development of membranes with both high throughput and high strength is a key requirement in the development of separation membranes, especially for microporous membranes. In water treatment, for example, microporous membranes are required not only to have a high water flux, but also to have a high strength.

To enhance the sustainability of membrane technology, it is crucial to acquire polymers from eco-friendly sources with a zero or limited carbon footprint, including recycled plastic waste. In this context, polypropylene (PP) emerges as a favorable substitute for conventional polymers, given its recyclability, resistance to chemicals, and hydrophobicity. It is a widely utilized thermoplastic, making up 20% of plastic waste. In 2022, the worldwide PP market volume stood at around 79.01 million metric tons, with expectations to reach nearly 104.99 million metric tons by 2030.

Polyethylene (PE) and polypropylene (PP) constitute nearly half of the world's plastic production. Unfortunately, only 9-10% of plastics are recycled. A 2017 report highlights that plastic packaging materials lose 95% of their value after a single use, leading to an annual economic loss of 120 billion dollars. The projected amount of plastic waste entering the oceans is anticipated to exceed 29 million metric tons by the year 2040. Producing membranes using PP presents a huge commercial potential for recycling abundantly available plastic waste.

Numerous studies have documented the successful application of plastic waste in the production of membranes. Plastics, such as polystyrene (PS), polyethylene terephthalate (PET), and polyvinyl chloride (PVC) have been used in membrane filtration applications.

Superhydrophobic membranes from polyolefin (PP/LDPE) wastes have been fabricated using a two-step technique that utilizes bio-based solvents for dissolution and thermally induced phase separation (TIPS) for effective oil-water separation. Valorization of Polyethylene Terephthalate (PET) waste into nanofibrous membranes has been demonstrated for oil removal using a binary solvent system and electrospinning technique. High-temperature solvent-resistant ultrafiltration membranes from PET waste were synthesized via non-solvent-induced phase separation (NIPS). Microfiltration membrane from acrylic fiber (AF) and low-density polyethylene (LDPE) shrink film wastes was fabricated using an electrospinning technique. A waterproof gas separation membrane from polystyrene waste was produced through a hot-pressing technique for $CO_2$ separation. Filtration membranes for oil in water and water in oil emulsions have been fabricated using PET waste via electrostatic spinning, in-situ deposition, and surface modification; biomimetic fabrication of PET waste via electrospinning with enhanced stability and emulsibility; Kevlar fiber waste via combining solvent replacement and freeze-drying route; and PE waste via swelling, solvent extraction and freeze-drying.

It is evident from these examples that plastic waste is a viable feedstock for membrane fabrication. Furthermore, xylene is conventionally employed in PP upcycling via dissolution; however, xylene is categorized as 'problematic' in accordance with the solvent selection guidelines. Consequently, the substitution of fossil-based solvents with renewable, eco-friendly alternatives for dissolution purposes holds considerable significance.

Bio-solvents such as Cyrene, PolarClean, Methyl lactate, Valerolactone, and Glycerol derivatives have been employed in the preparation of blends for synthesizing membranes using various polymers. However, bio-solvents for the dissolution of polyolefins remain challenging, mainly because the polyolefins are chemically stable and cannot be dissolved in any solvent without heating.

A microporous PP membrane was recently prepared via TIPS using environment-friendly carnauba wax with soybean oil. Similarly, pinene and limonene were demonstrated for polyolefin's dissolution and for the synthesis of water-in-toluene emulsion separation membranes. Also, cymene was used to prepare a dope solution for the fabrication of a nanofiltration membrane to upcycle PP face mask waste. These examples demonstrate that bio-solvents are capable of replacing fossil-based solvents.

In previous studies, polymeric membranes were precipitated either using a binary solvent system in TIPS or a non-solvent system in NIPS. A binary solvent system typically uses die-casting to fabricate membranes, and a second solvent is added to remove the first solvent and crystallize the polymer. Spin-casting techniques, on the other hand, do not require a binary system since the solvent is removed by centrifugal forces and the polymer crystallizes after the removal of the solvent, as demonstrated previously. It also provides uniform films with controlled thickness ranging from 1 to 100 μm. Microporous membranes were fabricated through tandem spin-casting and annealing for oil-water emulsion separation using only one solvent, cymene, naturally present in over 100 plants as well as more than 200 foodstuffs including spices.

Polypropylene (PP) has good chemical resistance, high strength, and is cheap and easy to obtain. Hollow fiber (including capillary) microporous membranes made with PP are particularly suitable for groundwater purification and wastewater treatment. Therefore, polypropylene is generally suitable as a raw material for preparing organic polymer microporous membranes.

Organic polymer microporous membranes are generally prepared by non-solvent-induced phase separation (NIPS), melt-stretching, and thermally induced phase separation (TIPS). Non-solvent-induced phase separation has always been the main method for making microporous membranes. The membranes produced by this method generally have good microporous structures, but the water flux and strength of the membranes are low, which is difficult to meet the aerobic requirement in wastewater treatment. The microporous membrane obtained by the melt stretching method has high strength, but its microporous structure is difficult to control, the pore size distribution is very wide, the porosity is generally low, and the water flux of the membrane is also low.

The TIPS method is a method developed in recent years. This method refers to dissolving a polymer in a high boiling point and low volatility solvent at a high temperature to form a homogeneous solution, and then cooling and cooling to cause solution phase separation. The reagent extracts the solvent to obtain a polymer microporous membrane with a certain structure and shape. The microporous membrane prepared by this method has the advantages of high strength, high porosity, and narrow pore size distribution, etc., and is suitable for various water treatment applications. However, the thermally induced phase separation method in the prior art also has the disadvantages of low industrialization and imperfect technology, resulting in a low membrane water flux.

Thus, a bi-layered superhydrophobic membrane solving the aforementioned problems is desired.

SUMMARY

In an embodiment, the present subject matter relates to a bi-layered superhydrophobic membrane formed from polypropylene. According to an embodiment, the bi-layered superhydrophobic membrane can have a thickness ranging from about 100 µm to about 1 mm. When subjected to oil-water emulsion separations, the superhydrophobic membrane can achieve an organic solvent flux of 14,000 Lm$^{-2}$h$^{-1}$ with a 96% water rejection. The bi-layered superhydrophobic membrane can be effectively used for water filtration, providing both selectivity and permeability, while offering an eco-friendly solution for reuse of polypropylene plastic waste.

According to an embodiment, a bi-layered superhydrophobic membrane can include a porous top layer formed from about 75% to about 100% polypropylene; and a porous base layer formed from about 75% to about 100% polypropylene, the porous base layer being less porous than the porous top layer, wherein a thickness of the bi-layered superhydrophobic membrane ranges from about 100 µm to about 1 mm.

According to an embodiment, a bi-layered superhydrophobic membrane can include a porous top layer comprising polypropylene, the porous top layer having a thickness ranging from about 60 µm to about 600 µm and a surface roughness ranging from about 120 nm to about 130 nm; and a porous base layer comprising polypropylene, the porous base layer having a thickness ranging from about 40 µm to about 400 µm.

These and other features of the present subject matter will become readily apparent upon further review of the following specification.

BRIEF DESCRIPTION OF THE DRAWINGS

FIGS. 4A-4H are SEM images of (4A) water contact angle on the PP superhydrophobic membranes; (4B) a top surface view of "SHM @ 160° C." membrane; (4C) a top surface magnified view of "SHM @ 160° C." membrane; (4D) bottom surface view of "SHM @ 160° C." membrane; (4E) a bottom surface magnified view of "SHM @ 160° C." membrane; (4F) a cross-sectional view of "SHM @ 160° C." membrane; (4G) a cross-sectional magnified view of "SHM @ 160° C." membrane; and (4H) contact angles of toluene (and other oils including hexane, heptane, dichloromethane, and diesel showed similar results) showing super-oleophilicity.

FIGS. 8A-8H depict (FIGS. 8A, 8B, 8C, 8D) atomic force microscopy (AFM) images of the semi-annealed base layer of the SHM @ 160° C. superhydrophobic membrane; (FIGS. 8F, 8G, 8H, 8I) atomic force microscopy (AFM) images of the newly applied top superhydrophobic layer; and (FIGS. 8E and 8J) graphs showing image roughness profile.

FIGS. 9A-9B are graphs showing (9A) tensile strength; and (9B) fraction strain, of the superhydrophobic membranes.

FIGS. 10A-10B are graphs showing oil-water filtration results for (10A) flux of organic solvent, and (10B) water rejection using superhydrophobic membranes SHM @ 160° C. and 170° C.

FIGS. 12A-12B show SEM images of the superhydrophobic membrane after oil-water separation.

FIG. 13 is a graph showing FTIR spectra of the SHM @ 160° C. membrane before and after oil-water separation.

FIGS. 14A-14B are graphs showing oil-in-water emulsion (14A) before separation; and (14B) after separation.

DETAILED DESCRIPTION OF THE PREFERRED EMBODIMENTS

Figure 1:
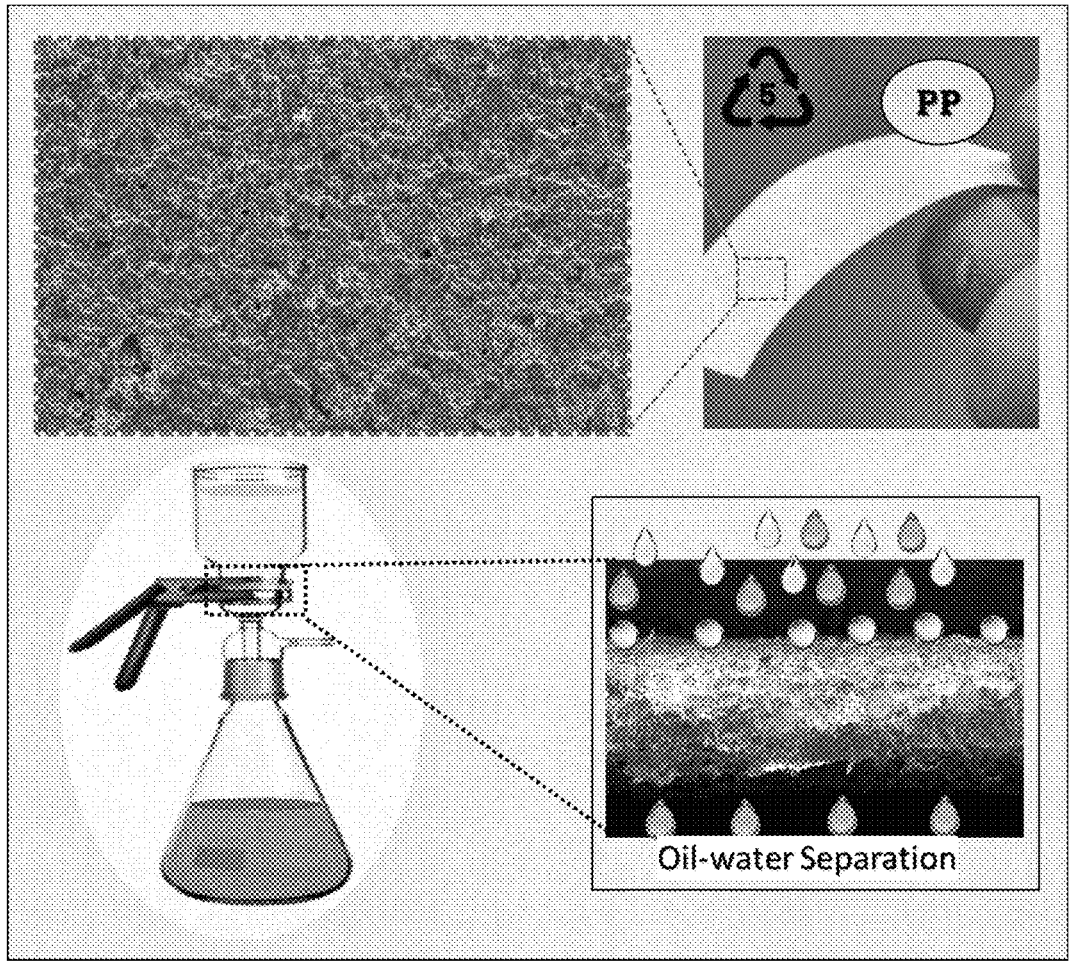
FIG. 1 is a schematic diagram showing the general conversion process of waste polypropylene (PP) into a bi-layered superhydrophobic membrane.

The following definitions are provided for the purpose of understanding the present subject matter and for construing the appended patent claims.

Definitions

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

In an embodiment, the present subject matter relates to a bi-layered superhydrophobic membrane having top and base layers formed from polypropylene (PP). In an embodiment, the polypropylene (PP) can include at least one of virgin polypropylene (PP), waste polypropylene (PP), and recycled polypropylene (PP). The bi-layered superhydrophobic membrane can be effectively used for water filtration, providing both selectivity and permeability, while offering an eco-friendly solution for reuse of plastic waste.

In an embodiment, the bi-layered superhydrophobic membrane can include a top layer and a base layer. In an embodiment, both the top layer and the base layer are formed from polypropylene. In an embodiment, the top layer can range in thickness from about 60 μm to about 600 μm. The top layer can exhibit a high degree of hydrophobicity or super-hydrophobicity, which can be defined as a level of water rejection ranging from about 91% to about 100%, for example, about 96% water rejection. Additionally, the top layer can include a first plurality of micropores for liquid passage.

According to an embodiment, the base layer can have a thickness ranging from about 40 μm to about 400 μm. The base layer can include a second plurality of micropores for liquid passage. The base layer can offer structural support and reinforcement for the top layer. In an embodiment, the base layer can have a higher degree of strength and a lower degree of hydrophobicity when compared to the top layer.

According to an embodiment, the bi-layered superhydrophobic membrane can have a thickness ranging from about 100 μm to about 1 mm. In an embodiment, the bi-layered superhydrophobic membrane can have a tensile strength ranging from about 13 MPa to about 28 MPa.

In an embodiment, the bi-layered superhydrophobic membrane can have a high degree of surface roughness, e.g., a surface roughness ranging from about 120 nm to about 130 nm. It is believed that the high degree of surface roughness of the top layer of the membrane can contribute to the superhydrophobicity of the top layer.

According to an embodiment, the bi-layered superhydrophobic membrane can separate water from an organic solvent-in-water emulsion by allowing the organic solvent to pass through micropores extending through the bi-layered superhydrophobic membrane, while rejecting water or preventing water from passing through the micropores. For example, the method can include flowing the emulsion on a top layer of the superhydrophobic filtration membrane, whereby oil passes through micropores in the membrane and water flows off the top layer of the membrane. In an embodiment, the bi-layered superhydrophobic membrane can achieve a level of water rejection ranging from about 91% to about 100%, for example, about 96% water rejection. In an embodiment, the bi-layered superhydrophobic membrane can have a contact angle ranging from about 150° to about 160°.

In an embodiment, the emulsion separations can include separation of water from an organic solvent. When subjected to emulsion separations, the bi-layered superhydrophobic membrane can achieve an organic solvent flux ranging from about 11,000 $Lm^{-2}h^{-1}$ to about 17,000 $Lm^{-2}h^{-1}$, for example, about 14,000 $Lm^{-2}h^{-1}$. In an embodiment, the bi-layered superhydrophobic membrane can provide a contact angle ranging from about 150° to about 160°. In an embodiment, the organic solvent can be selected from the group consisting of toluene, hexane, oil, dichloromethane, heptane, and a combination thereof. In an embodiment, the oil is diesel oil.

Accordingly, in one embodiment, the present subject matter relates to a two-layered superhydrophobic membrane, wherein each layer of the membrane includes polypropylene. In an embodiment, the polypropylene includes at least one of waste polypropylene, virgin polypropylene, and recycled polypropylene. In an embodiment, each layer of the membrane includes about 75% to about 100% polypropylene, e.g., about 80%, about 85%, about 90%, about 95%, or about 100% polypropylene.

Figure 2:
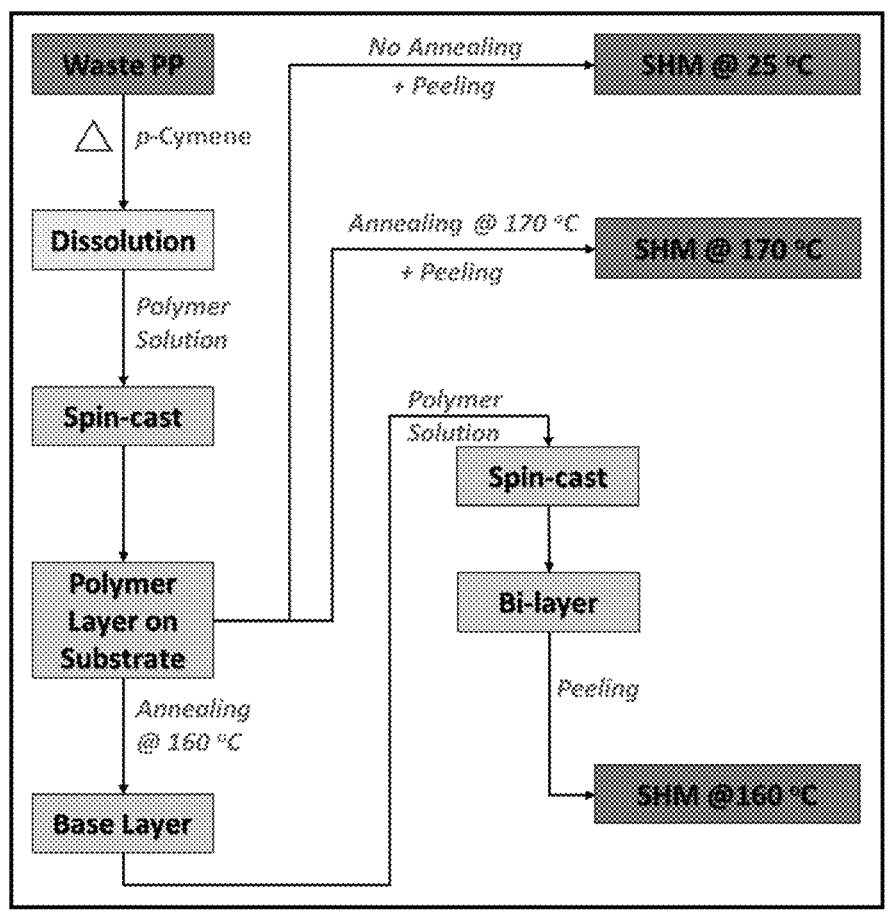
FIG. 2 is a schematic representation for the synthesis of the superhydrophobic membrane according to the present teachings.

An exemplary method for preparing the superhydrophobic membrane is illustrated in FIG. 2. According to an embodiment, a method of preparing the superhydrophobic membrane can include dissolving polypropylene in an alkyl benzene at a temperature of about 145° C. to about 175° C. for a period of time ranging from about 10 minutes to about 25 minutes to provide a hot polymer solution; pouring the hot polymer solution on a heated glass substrate; and spin-coating the substrate. In an embodiment, the alkyl benzene can be p-cymene. In an embodiment, the polypropylene can be dissolved in an alkyl benzene at a temperature of about 160° C. for about 20 minutes. In an embodiment, the hot polymer solution can be poured on the substrate and spin-coated at a gradient speed ranging from about 400 rpm to about 3000 rpm and for a period of time ranging from about 10 seconds to about 60 seconds.

In an embodiment, the polymer layer formed on the glass substrate after spin coating can be subject to annealing. In an embodiment, a second polymer layer can be formed on the first polymer layer after annealing, e.g., while the first polymer layer is still hot, followed by another cycle of spin coating.

In an embodiment, the annealing can last for a period of time ranging from about 1 minute to about 25 minutes and take place at a temperature ranging from about 150° C. to about 180° C., e.g., about 155° C., about 160° C., about 165° C., about 170° C., and about 180° C. In an embodiment, the annealing lasts for about 15 minutes to about 20 minutes at a temperature of about 160° C., e.g., in a closed hot air oven.

In an embodiment a method of separating oil from water in an oil-in-water emulsion can include flowing the emulsion on a top layer of the superhydrophobic filtration membrane, whereby oil passes through micropores in the membrane and water flows off of the top layer of the membrane.

The present subject matter can be better understood by referring to the following examples.

EXAMPLES

Example 1

Material and Reagents

Reagents such as dichloromethane, hexane, heptane, toluene, and span80 were obtained from Sigma Aldrich. P-cymene was purchased from Njnq Bio-tech Ltd. and used without further purification. Diesel oil was purchased from a local petrol station. Polypropylene (PP) plastic waste was collected in the form of plastic bottles and food containers from a local market. Substrate support was prepared by cutting plain glass plates to a size of 5 cm×5 cm, which were then mounted onto the chuck of a spin coater. The chuck used for spin coating was custom-made by Ossila.

Heating was carried out using a MINO/30/TDIG hot air oven manufactured by Genlab Ltd. Hot plate heating was performed on a Heidolph magnetic hotplate stirrer. Tensile strength tests were conducted using a friction/peel tester from Lloyd Instruments Ltd, located in Bognor Regis, UK. Scanning electron microscope (SEM) images were captured with FEI Quanta650FEG. DSC was used to determine the thermal behavior of PP-based hydrophobic thin films and to evaluate the changes in enthalpy before and after heating. Thin films were heated in a crucible at 10° C./min under nitrogen in the 25-800° C. temperature range using Q50 Perkin Elmer thermal analyzer. X-ray diffraction (XRD) measurements were measured using PANalytical Empyrean multipurpose XRD by Malvern Panalytical, Malvern, UK. Surface morphology analysis was conducted through AFM Park NX10 in order to understand the surface roughness of thin films. Fourier-transform infrared spectroscopy (FTIR) was carried out using the PerkinElmer Frontier instrument. The optical contact angle was calculated using OCA 35, Dataphysics Instruments GmbH—Filderstadt, Germany. The water concentration in the permeate was measured using Karl-Fischer coulometric titration. Porosity was calculated using the wet porosity method, where the difference between the weight of the thin film with ethanol and the weight of the thin film was converted into the volume by dividing it by density. Thickness was measured with a micrometer and cross-referred with Deflesko FS3 PosiTector 6000 using an iron metal base.

Example 2

Preparation and Characterization of Superhydrophobic Membranes

FIGS. 1-2 are diagrams showing the general process used to convert waste polypropylene (PP) into a bi-layered membrane. Waste PP (9 g) was dissolved in 100 ml of p-cymene under reflux conditions at a temperature of 160° C. for 20 minutes. A glass plate (substrate) was cleaned and then heated to a temperature of 130° C. before being placed on a spin coater chuck. The hot polymer solution was poured on the substrate and spin-coated at a gradient speed of 400 rpm for 10 sec, 1000 rpm for 60 sec, and 3000 rpm for 60 sec. The excess solvent and polymer (waste PP) solution were collected from the drain for recycling. After completion of the spin coating, the substrate was separated from the chuck and subjected to annealing.

Figure 3A:
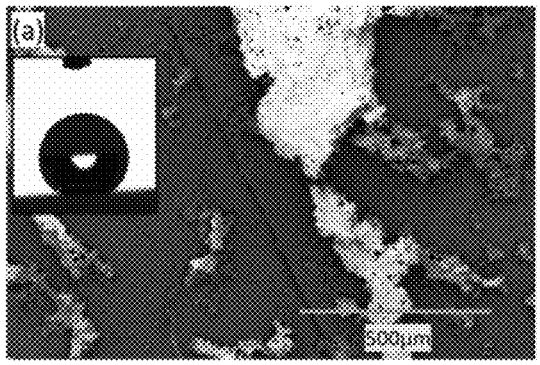
FIGS. 3A-3F are SEM images at different resolutions showing (3A, 3B, 3C) SHM@25° C. PP membranes; and (3D, 3E, 3F) SHM@170° C. membranes (insets show water contact angles).

Upon completion of spin coating, the substrate was separated from the chuck and not subjected to any annealing (kept under ambient temperature, i.e., 25° C.). This layer was superhydrophobic in nature but could not be peeled in a single unit. This single layer membrane, referred to as the SHM @ 25° C. membrane, was found to be porous but lacked the mechanical strength to independently hold its structure (FIGS. 3A-3C).

After completion of the spin coating, the substrate was separated from the chuck and subjected to annealing at 170° C. for 1-2 min (on the hot plate until the white film turned transparent) or for 10-15 min in a hot air oven. This layer was peeled off from the substrate. This single layer membrane, referred to as the SHM@ 170° C. membrane. was found to be less porous because of the melting of the polymer (FIGS. 3D-3F), and thus, not ideal for use as a filtration membrane.

After completion of the spin coating, the substrate was separated from the chuck and subjected to annealing at 160° C. for 15-20 min in a closed hot air oven (not overheated as the pores would close or shrink). This layer, representing the base layer, was not peeled off from the glass substrate. As soon as it was removed from the hot air oven, a top layer was applied on the hot base layer, followed by a repetition of the spin coating process. The combined base layer and the newly applied superhydrophobic top layer were separated from the substrate, resulting in a superhydrophobic filtration membrane (referred to as the SHM @ 160° C. membrane). The base layer in this membrane was found to be semiporous (because of the partial melting of the polymer) while the top layer was porous and superhydrophobic in nature.

The objective was to utilize superhydrophobic membranes in the treatment of oil-water emulsions, necessitating the use of freestanding membranes. The primary focus was on attaining three crucial parameters essential for effective membrane performance: (a) the presence of pores, (b) superhydrophobicity, and (c) mechanical strength. These desired characteristics were to be achieved through a process involving controlled heating of the superhydrophobic surface.

Initially, an attempt was made to separate the superhydrophobic membrane from the substrate at room temperature. Unfortunately, during peeling, the surface could not maintain its structure and collapsed. This superhydrophobic material was denoted as the SHM@25° C. membrane. Consequently, the substrate temperature was elevated above the polymer's melting point, specifically at 170° C. This led to the transformation of the superhydrophobic surface, causing it to transition into a less hydrophobic state characterized by pore collapsing and a reduction in roughness. However, this membrane ("SHM@ 170° C. membrane") could be separated from the substrate easily and effortlessly, exhibiting a remarkable mechanical strength.

Subsequent SEM investigations focused on studying the surface morphology and heating impact on the structural arrangement of superhydrophobic surfaces pointed to the SHM@ 25° C. membrane surface exhibiting high surface roughness and spherical blobs, contributing to superhydrophobicity (FIGS. 3A-3B). These spherical blobs create the Cassie-Baxter surface phenomenon, resulting in superhydrophobicity. The spherical blobs have spiky structures that are responsible for the observed increase in superhydrophobicity.

The contact angle for this membrane, when placed on a glass substrate, was measured to be 153°, as depicted in FIG. 3A inset. However, despite this high contact angle, the surface lacked the necessary strength to function as a freestanding membrane. FIG. 3C illustrates the porous structure network of the superhydrophobic surface, appearing well-connected but exhibiting brittleness due to weak intermolecular interactions. To address this limitation, surface modification was deemed necessary, achieved through substrate heating.

Figure 3D:
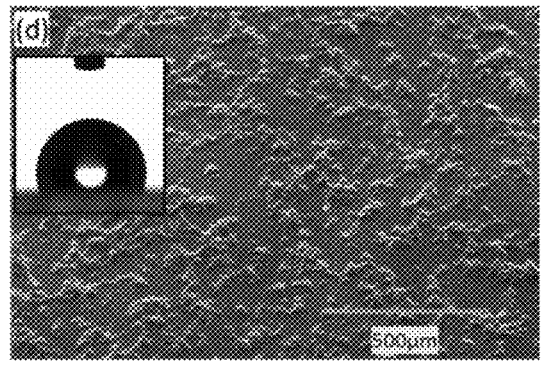
Figure 3B:
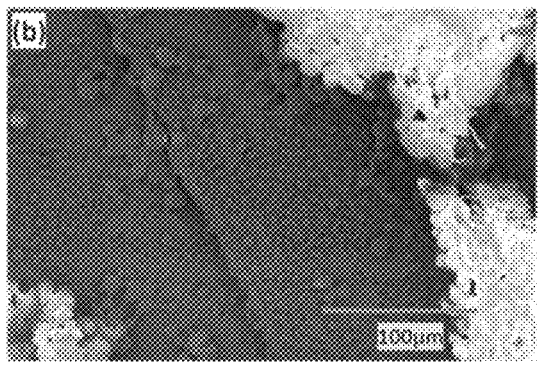
Figure 3E:
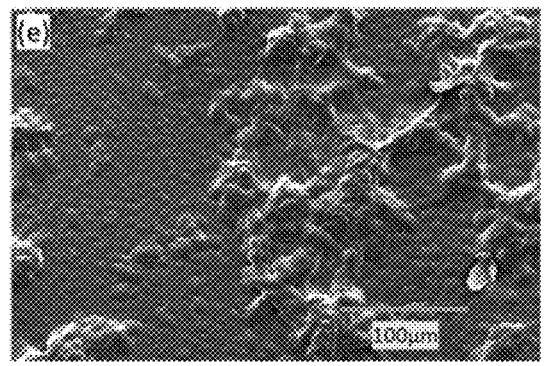
Figure 3C:
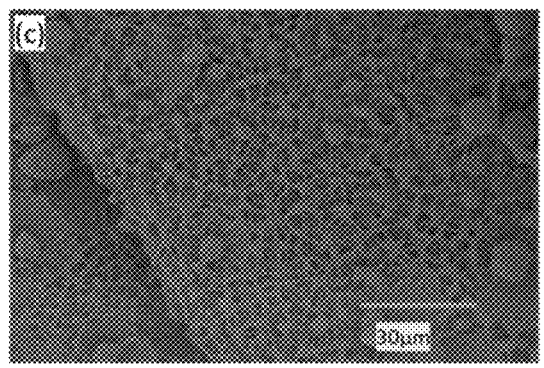
Figure 3F:
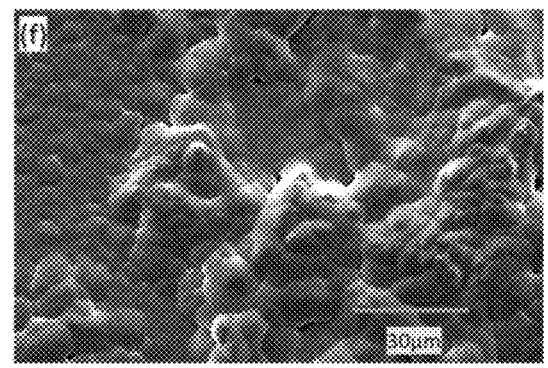

FIGS. 3D-3E showcase the heated surface where spherical blobs melted into smooth crests and depressions, resulting in a decreased contact angle to 109°, as shown in FIG. 3D inset. FIG. 3F displays the heated and melted porous structure, leading to closed pores that, in turn, reduced the flux. The heating process, while enhancing mechanical strength, simultaneously resulted in a decrease in contact angle, porosity and superhydrophobicity.

To overcome these challenges, an alternative approach was subsequently explored, involving the construction of two layers: one focused on strength and pores and the other one focusing on superhydrophobicity and pores, followed by coupling both layers to maintain all three desired membrane parameters.

The first layer largely lost its superhydrophobic surface properties after the heating process (conducted at 160° C. for 15-20 min in a closed atmosphere), resulting in the softening and melting of the polymer leading to rearrangement of polymer chains with an enhanced mechanical strength. Heating duration was carefully controlled to 15-20 min to preserve the porous structure with sufficient strength after which the second polymer layer was deposited onto the hot first layer to ensure efficient adhesion between the layers. The newly added layer exhibited superhydrophobic properties and high porosity, crosslinked with the first layer. This crosslinking was possible due to the slow transfer of heat from the newly added layer solution to the first layer, leading to binding through strong intermolecular dispersion forces. One challenge observed during this process was that when the second layer was applied, some polymer chains penetrated the pores of the first layer, blocking them. This limitation was successfully addressed by increasing the speed of the spin-coater. Elevating the spin coating speed ensured that the centrifugal forces of polymers dominated the gravitational forces, thus retaining the pores in the structure.

Further heating was avoided in the final material aiming to retain superhydrophobicity, porosity and mechanical strength, also preventing chipping. The resulting membrane, subjected to oil-water separation, was denoted as the SHM@ 160° C. membrane.

Example 3

Characterization of the Superhydrophobic Membranes

Figure 4H:
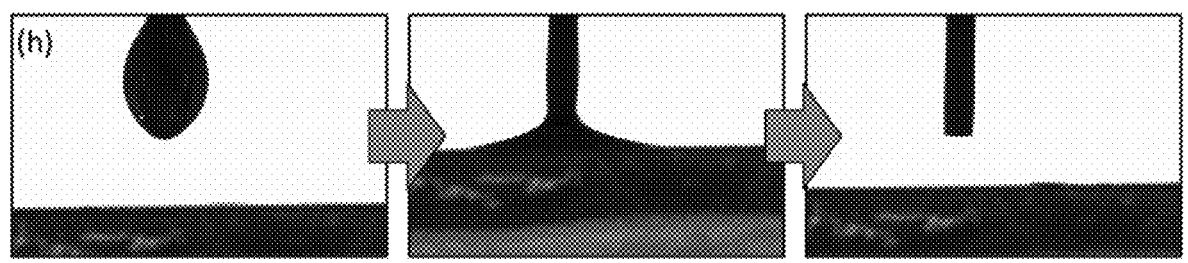

FIGS. 4A-4H depict SEM images obtained during experiments on waste PP-derived superhydrophobic membranes prepared using the double-layer approach. FIG. 4A shows a contact angle exceeding 155°, while FIGS. 4B-4C depict the porous network and high surface roughness of the superhydrophobic membrane. The porosity was created by the phase-separated regions of the solvent-solute formulation. During the spin coating process, as the solvent was removed from the substrate, centrifugal forces threw the solvent molecules outwards. The gradual cooling of the polymer resulted in condensation and solidification. Simultaneously, during cooling and rotation processes, the polymer molecules condensed, creating spherical blobs. The removal of solvent molecules dragged the polymer molecules towards the outside, resulting in spiky protrusions that are believed to play a major role in creating the superhydrophobic surface. On these spiky protrusions, water droplets were suspended and repelled, a phenomenon widely known as the Cassie-Baxter phenomenon. The spiky structure was obtained by removing solvent molecules from the substrate through centrifugal forces during spin coating rotation. This superhydrophobic surface prevents water penetration and allows water to suspend on the surface. Conversely, the superhydrophobic membrane acts as a super-oleophilic membrane due to its high super-oleophilicity, allowing the majority of oils to pass through while preventing water penetration.

As discussed previously, porosity is a prime characteristic that facilitates penetration through the membrane. FIGS. 4D-4E show the bottom view of the superhydrophobic membrane where polymer molecules are interconnected due to the applied controlled heat. The membrane is porous from the backside, allowing the passage of oils or lipophilic materials. The observed polymeric network bridges in FIG. 4E connect multiple adjacent polymer spherical blobs. Following phase separation, spherical nuclei undergo growth and interconnection, leading to solidification and subsequent formation of the membrane structure. These connections arise from intermolecular dispersion or Vander Waal forces.

The surrounding polymer-lean area, characterized by a lower polymer concentration, evolves into the pores of the membrane.

The cross-sectional view of the superhydrophobic membrane shown in FIG. 4F represents the compact arrangement of the spherical blobs and the porous structure from the phase-separated regions created by the removal of the solvent. The surface was found to be very homogeneous, and the polymeric blobs were uniformly distributed, resulting in a homogeneous pore size distribution. The close view of the cross-section in FIG. 4F showed the compact globular arrangement of the superhydrophobic spheres. The space between the spherical blobs acts as passage channel of the membrane, through which the lipophilic solvents easily permeate (while hydrophilic solvents are repelled).

The contact angle of toluene on this surface was found to be less than 1° as it penetrates inside the membrane as soon as the droplet was dispensed (see FIG. 4H). Similar results were observed with organic solvents including hexane, heptane, diesel, and dichloromethane, demonstrating that such superhydrophobic membranes can be used in oil-water separation.

Figure 5:
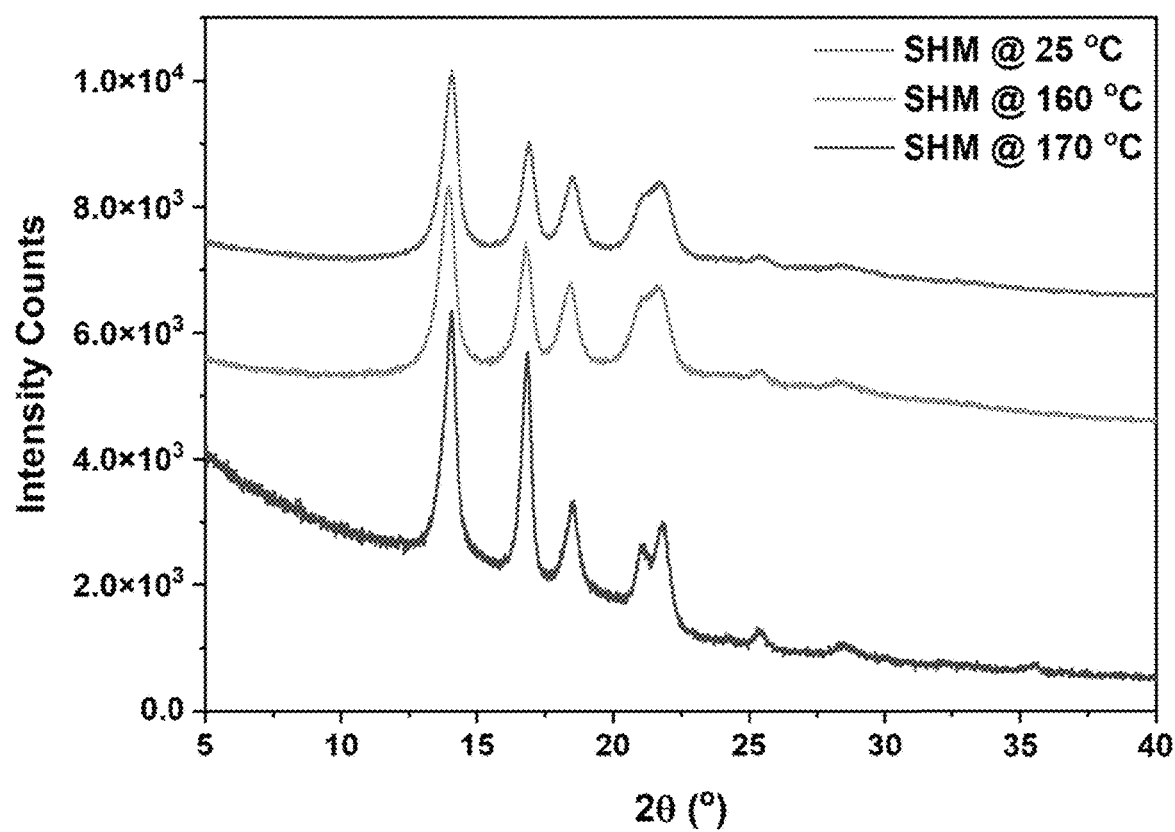
FIG. 5 is a graph showing X-ray diffraction (XRD) patterns of superhydrophobic membranes at different annealing temperatures.

XRD investigation of superhydrophobic membranes pointed to the presence of similar peaks observed in pristine PP. This resemblance suggests that the basic skeleton and the lattice planes are unaltered and retain the PP polymeric structure. However, the intensity and the sharpness of the patterns vary. The area under the curve was utilized to determine crystallinity percentages. Specifically, the SHM@25° C. membrane exhibited 43% crystallinity, while the SHM@ 160° C. membrane and the SHM@ 170° C. membrane demonstrated higher crystallinity percentages of 51% and 58%, respectively. Such increases in crystallinity are attributed to the realignment and rearrangement of the polymeric chains to compact and dense packing, resulting in sharp, distinct patterns, as seen in FIG. 5.

In other words, the more amorphous the polymer is, the more porous passages there are, leading to an improved solvent penetration. The superhydrophobic membrane at 25° C. possesses more porosity, but due to a lack of internal strength, the separation of oil-water emulsion is difficult. The SHM@ 160° C. membrane comparably has a porous structure and mechanical strength, making it suitable for the separation of lipophilic and hydrophilic materials. In contrast, the superhydrophobic membrane at 170° C. has minimal pores, decreasing the water rejection due to an increase in wettability and a decrease in water contact angle.

Figure 6:
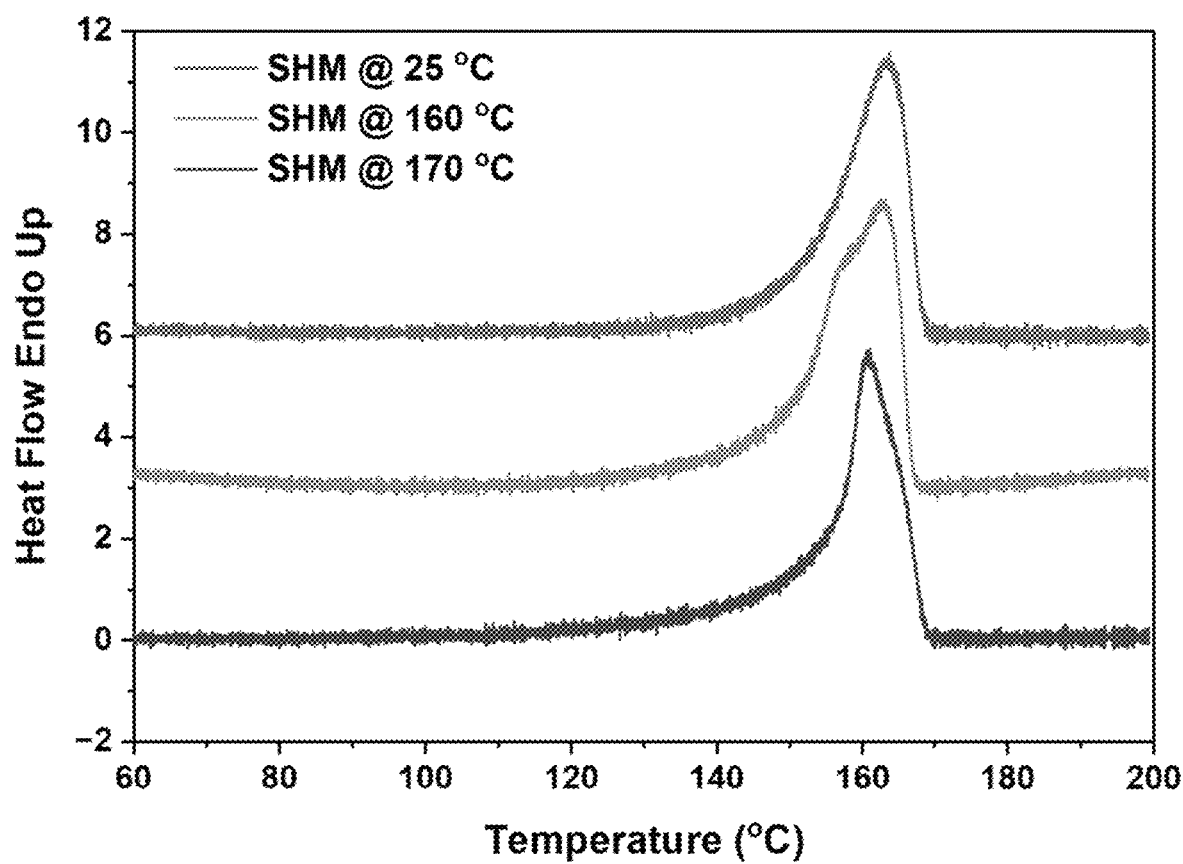
FIG. 6 is a graph showing differential scanning calorimetry (DSC) plots of superhydrophobic membranes.

Superhydrophobic membranes at different annealing temperatures were further subjected to differential scanning calorimetry to determine the melting points of the polymers. FIG. 6 is a graph showing differential scanning calorimetry (DSC) plots of the membranes. The maximum peak melting temperature for the superhydrophobic membrane at room temperature (the SHM@25° C. membrane) was observed at 163.5° C., as compared to 162.7° C. for the SHM@160° C. membrane further down to 160.7° C. for the SHM@170° C. membrane. The melting peak for the superhydrophobic membrane at room temperature was higher with respect to the other two membranes. This elevated melting peak for the room temperature sample was attributed to the presence of a more amorphous character and perfect crystallite structures, as no annealing or cooling was carried out in the preparation of this membrane. In contrast, the SHM @ 170° C. membrane was annealed beyond its melting point and then rapidly cooled down, resulting in imperfect crystal growth (leading to low melting peaks). On the other hand, DSC curves in the SHM@ 160° C. membrane showed a shoulder peak (beside the main melting peak) attributed to the presence of imperfect growth crystals during the partial annealing process. The DSC plot for these three membranes is illustrated in FIG. 6.

Figure 7:
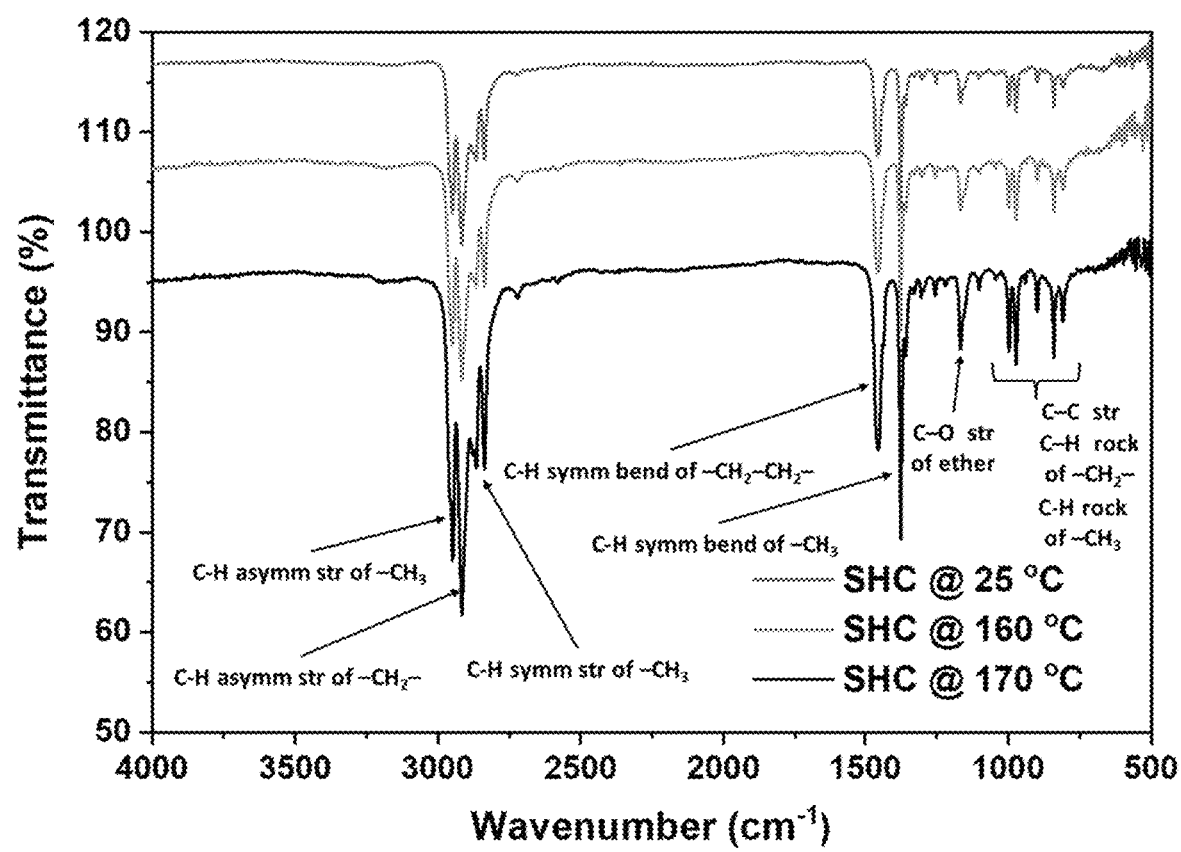
FIG. 7 is a graph showing Fourier Transform Infrared (FTIR) spectra of the superhydrophobic membranes.

Superhydrophobic membranes were subsequently investigated using Fourier Transform Infrared (FTIR) to understand the effect of annealing on the functional groups. These membranes retained the structural skeleton (FIG. 7), showing C-H asymmetric and symmetric stretching bands in the region between 2960 2830 $cm^{-1}$. C-H symmetric bending groups were identified at 1430 $cm^{-1}$ and 1370 $cm^{-1}$. C-C stretching, C-H bending vibrations were observed in the fingerprint region. No peak was present in the region of 1650-1500 $cm^{-1}$, pointing to complete solvent removal. Due to heat during the dissolution process, the polymer was partially oxidized and showed ether linkages in all three membranes at ~1180 $cm^{-1}$. In addition, upon increasing the annealing temperature, the intensity of the peaks was enhanced, proposing the formation of intermolecular linkages. The overall superhydrophobicity was not compromised for the SHM@ 160° C. membrane.

Surface roughness assessments were also conducted using AFM for the SHM@ 160° C. membrane (FIGS. 8A-8H). The surface roughness for the first layer was observed to be 63.1 nm, and the surface roughness of the second layer was observed to be 123.3 nm. As the first layer was heated to 160° C., the surface roughness decreased, becoming relatively smoother (superhydrophobicity was reduced). However, the surface was not completely smooth, and the pores were not fully blocked as shown in FIGS. 4A-4H. When the newly added superhydrophobic layer was applied, the surface roughness remained quite rough, preventing water molecules from settling on the surface or penetrating through it.

The mechanical strengths of all synthesized membranes were then investigated. The SHM @ 25° C. membrane was found to lack sufficient strength to maintain its structure, with a tensile strength of approximately 1 MPa. In contrast, the SHM @ 170° C. membrane, annealed to a temperature above the melting point, exhibited a higher mechanical strength of 28 MPa. However, the SHM @ 160° C. membrane demonstrated an average tensile strength of 13 MPa. This reduction in strength can be attributed to partial annealing below the melting point of the polymer, necessary for retaining a porous structure.

The tensile strength of the SHM @ 160° C. membrane, ranging from 11-15 MPa with a 9 wt. % polymer, is comparable to prior studies, where tensile strengths of 11-14 MPa were achieved using a 15 wt. % polymer. Despite this reduction in strength, it remains adequate for the filtration process and was thus applied in the separation of water from oil. Notably, the fraction strain was decreased with an increase in annealing temperature, as illustrated in FIGS. 9A-9B. The error bars represent the standard deviation observed during the experimentation for five membranes.

Example 4

Crystallinity Calculation

XRD patterns were generated using Origin software (FIG. 5). Initially, a baseline was plotted, and the area under the curve was calculated for the 5-90° angle range, providing the total area under the curve. Subsequently, the area under the curve of the peaks resembling PP, i.e., peaks in the 13-22 region, was calculated. Once the area under the curve of this region was determined, these values were then input into Formula 1, as follows:

$$\% \text{ Crystallinity} = \left(\frac{\text{area under the curve for } PP \text{ region}}{\text{total area under the curve}}\right) \times 100\% \quad \text{Formula 1}$$

Example 5

Water in Organic Solvent Emulsion Preparation

Preparation of the emulsion was carried out using a known procedure. For the water-in-toluene emulsion, 0.5 g of Span80 (HLB=4.3) was combined with 114 mL of toluene, followed by the addition of 1 mL of water. The resulting mixture was stirred for a duration of 3 hours, resulting in an emulsion with droplet sizes ranging from 2 µm to 20 µm. Similarly, for the water-in-hexane emulsion, 0.7 g of Span80 was mixed with 114 mL of n-hexane, and 2 mL of water was added. The mixture underwent stirring for 3 hours, producing an emulsion with droplet sizes falling within the range of 1 µm to 5 µm. For the water-in-diesel emulsion, 0.5 g of Span80 was introduced into 100 mL of diesel, and 1 mL of water. After 3 hours of stirring, the emulsion exhibited droplet sizes varying from 1 m to 30 km. In the case of the water-in-dichloromethane emulsion, 0.5 g of Span80 was combined with 114 mL of dichloromethane, and 1 mL of water was added. The mixture underwent stirring for 3 hours, resulting in an emulsion with droplet sizes ranging from 500 nm to 10 µm. Lastly, for the water-in-heptane emulsion, 2 mL of water was added to 114 mL of heptane, and the mixture was sonicated at a power level of 450 W for 1 hour, leading to droplet sizes within the range of 2 to 20 µm. All the emulsions prepared in this study exhibited stability for a period of 6 hours, with no observed demulsification.

Water rejection was calculated from the water concentrations in the feed and the permeate through a Formula 2, shown below:

$$\text{Water rejection} = \left(1 - \frac{\text{water concentration in permeate}}{\text{water concentration in feed}}\right) \times 100\% \quad \text{Formula 2}$$

Example 6

Emulsion Separation Experiments

Oil-water emulsion separation was carried out using a 0.09 MPa vacuum-facilitated filtration unit. The flux was measured using the formula, F=V/At. Where F is flux, V is the volume of the effluent passed through the membrane, A is the area of the filtration unit, and t is the time taken to pass through the membrane. An area of 12.56 cm$^2$ was used in the filtration experiment, with an exposed radius of 2 cm. In each trial, a volume of 10 ml of emulsion was introduced into the filtration receiver before activating the pump, and subsequently, the elapsed time was measured.

Figure 10B:
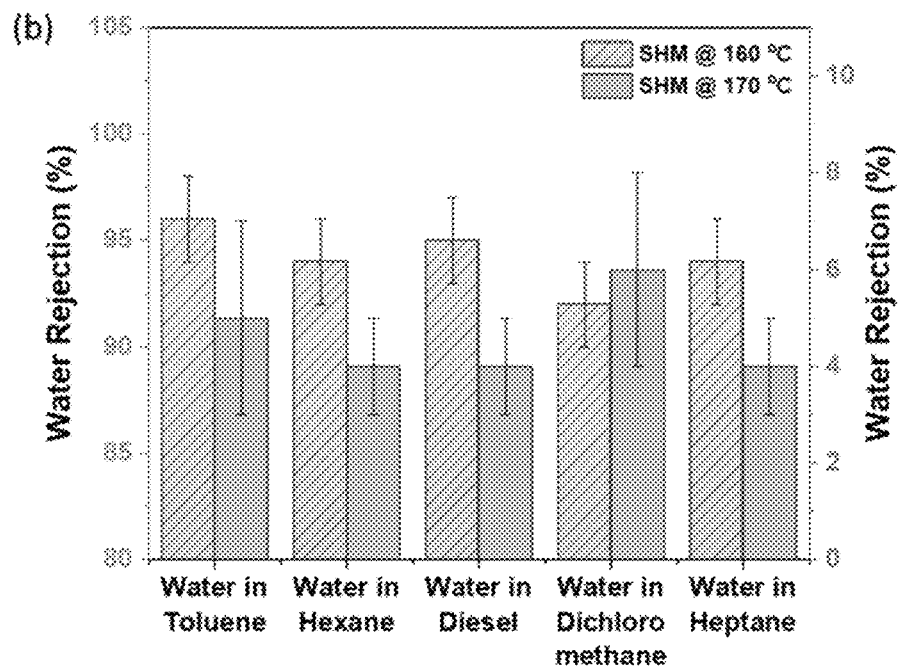

It was observed in the emulsion separation experiments, the flux for the SHM @ 160° C. was 12,738 (L m$^{-2}$ h$^{-1}$) for toluene, 14,331 (L m$^{-2}$ h$^{-1}$) for hexane, 13,331 (L m$^{-2}$ h$^{-1}$) for heptane, 13,981 (L m$^{-2}$ h$^{-1}$) for dichloromethane, and 9558 (L m$^{-2}$ h$^{-1}$) for diesel because of relatively high viscosity. However, the flux exhibited by the SHM at 170° C. remained notably low due to the membrane's exceptionally small micropores, which resulted in a reduced flow of solvent, see FIG. 10A. Also, water rejection studies were carried out, where the superhydrophobic membrane SHM @ 160° C. exhibited excellent water repulsion properties due to its superhydrophobicity. It restricted most of the water with a rejection efficiency of ~96% (FIG. 10B). The SHM@ 160° C. membrane displayed notable permeability and separation efficiency, evidenced by a water rejection rate of 96%±2 and a flux of 14000 (L m$^{-2}$ h$^{-1}$). These findings align closely with previously reported values, where the flux was recorded at 9554 (L m$^{-2}$ h$^{-1}$), and the water rejection rate at 95.8%±2. Karl-Fischer titrations, to assess the presence of water in organic solvents, revealed a permeating water content below 350 ppm. Other hydrophobic membranes were reported to have similar levels of toluene purity.

However, in the case of the SHM @ 170° C. membrane, the water rejection efficiency decreased due to a reduced water contact angle that allowed water to pass through the membrane, rendering it inefficient. Additionally, it was noted that as the viscosity of the solvent increased, the filtration process slowed down. There were instances where the membrane got blocked due to the entrapment of relatively larger crude oil particles. Nevertheless, by subjecting the membrane to a washing process using semipolar organic solvents such as dichloromethane, the larger particles were effectively eliminated, restoring the membrane's optimal functionality.

Figure 11:
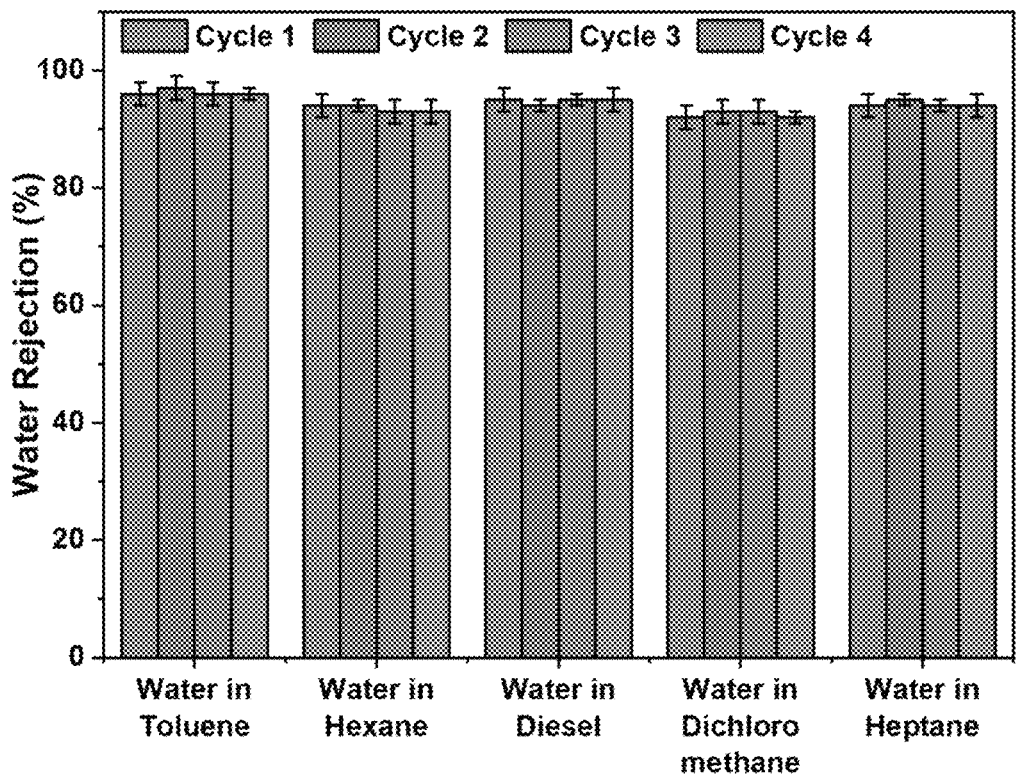
FIG. 11 is a graph showing water rejection efficiency for different emulsions using SHM @ 160° C. membrane under repeated oil-water separations.

The as-prepared membranes were reused for oil-water separation at least four times, where the results were promising. And the water rejection efficiency for the SHM @ 160° C. membrane was found to be above 92% even after four cycles. The rejection percentages for different emulsions are shown in FIG. 11.

SEM images of the membrane post oil-water separation revealed an insignificant change in morphology (FIGS. 12A-12B). The spherical globules and superhydrophobicity were retained, indicating robust stability. It was observed that scrubbing the surface carried a high risk of damage. Consequently, a more cautious approach was taken by back flushing the membrane to remove any potential clogging, although, with the oils employed, no such issues were encountered. This process demonstrates reproducibility and can be repeated for multiple experiments. FIG. 13 presents FTIR spectra of SHM @ 160° C. before and after oil-water separation. The spectra reveal minimal alterations in the chemical composition, indicating a high degree of chemical stability. This observation suggests that the material maintains its integrity and remains largely unchanged even after undergoing oil-water separation.

An oil-in-water emulsion using diesel was created to assess the membrane's separation effectiveness, as illustrated in FIGS. 14A-14B. Optical microscopy images highlight the clarity of the collected filtrate (on the right) in comparison to the initial turbid feed emulsion (on the left). Furthermore, there is a notable contrast in the phase composition between the feed and the resulting filtrate. In the pre-filtration emulsion, the image depicts densely packed oil droplets while the filtrate image shows an absence of any droplets, indicating the successful elimination of oil through the filtration process.

It is to be understood that the present methods and products are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A bi-layered superhydrophobic membrane, comprising:
a porous top layer formed from about 75% to about 100% polypropylene; and
a porous base layer formed from about 75% to about 100% polypropylene, the porous base layer being less porous than the porous top layer,
wherein a thickness of the bi-layered superhydrophobic membrane ranges from about 100 μm to about 1 mm,
wherein a surface roughness of the bi-layered superhydrophobic membrane ranges from about 120 nm to about 130 nm, and
wherein a thickness of the top layer of the bi-layered superhydrophobic membrane ranges from about 60 μm to about 600 μm.

2. The bi-layered superhydrophobic membrane of claim 1, wherein a thickness of the base layer of the bi-layered superhydrophobic membrane ranges from about 40 μm to about 400 μm.

3. The bi-layered superhydrophobic membrane of claim 1, wherein the bi-layered superhydrophobic membrane has a tensile strength ranging from about 13 MPa to about 28 MPa.

4. The bi-layered superhydrophobic membrane of claim 1, wherein the polypropylene comprises at least one polypropylene selected from the group consisting of virgin polypropylene, waste polypropylene, and recycled polypropylene.

5. The bi-layered superhydrophobic membrane of claim 1, wherein the top layer of the bi-layered superhydrophobic membrane is more hydrophobic than the base layer of the bi-layered superhydrophobic membrane.

6. A method of separating water from a water-in-organic solvent emulsion, comprising:
contacting the water-in-organic solvent emulsion with the top layer of the bi-layered superhydrophobic membrane of claim 1, whereby the organic solvent passes through micropores in the bi-layered superhydrophobic membrane and water flows off the top layer of the bi-layered superhydrophobic membrane.

7. The method of claim 6, wherein a level of water rejection from the top layer of the bi-layered superhydrophobic membrane ranges from about 91% to about 100%.

8. The method of claim 7, wherein the organic solvent is selected from the group consisting of toluene, hexane, oil, dichloromethane, heptane, and a combination thereof.

9. The method of claim 8, wherein the oil is diesel oil.

10. A bi-layered superhydrophobic membrane, comprising:
a porous top layer comprising polypropylene, the porous top layer having a thickness ranging from about 60 μm to about 600 μm and a surface roughness ranging from about 120 nm to about 130 nm; and
a porous base layer comprising polypropylene, the porous base layer having a thickness ranging from about 40 μm to about 400 μm.

11. The bi-layered superhydrophobic membrane of claim 10, wherein
the top layer is formed from about 75% to about 100% polypropylene; and
the base layer is formed from about 75% to about 100% polypropylene.

12. The bi-layered superhydrophobic membrane of claim 10, wherein the porous base layer is less porous than the porous top layer.

13. The bi-layered superhydrophobic membrane of claim 10, wherein a thickness of the bi-layered superhydrophobic membrane ranges from about 100 μm to about 1 mm.

14. The bi-layered superhydrophobic membrane of claim 10, wherein the porous top layer imparts high surface roughness, leading to superhydrophobicity for selective separation, and simultaneously provides micropores to ensure effective liquid passage.

15. The bi-layered superhydrophobic membrane of claim 10, wherein the porous base layer serves as a substrate for the porous top layer, offering structural support and strength, while also including sufficient micropores to maintain high permeability.

* * * * *